United States Patent Office 3,636,148
Patented Jan. 18, 1972

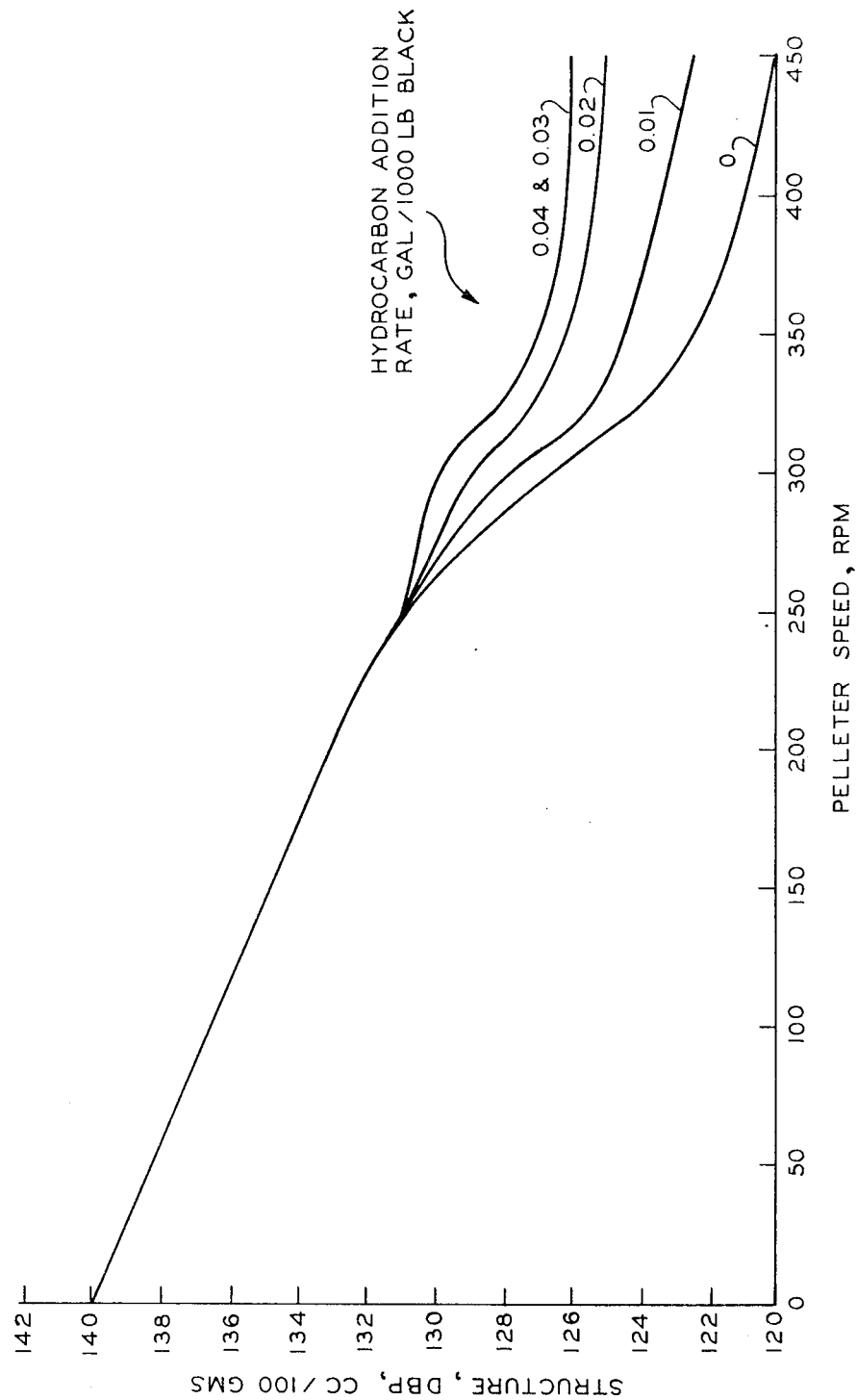

3,636,148
CARBON BLACK PELLETING
John E. Slagel, Orange, Tex., assignor to
Phillips Petroleum Company
Filed Aug. 7, 1969, Ser. No. 848,277
Int. Cl. B01j 2/12
U.S. Cl. 264—40                             10 Claims

ABSTRACT OF THE DISCLOSURE

A method for controlling the structure of a pelleted carbon black which involves pelleting the black in the presence of a hydrocarbon and controlling either the speed of the pelleter or the rate of addition of hydrocarbon, or both, to produce a pelleted black of a desired structure.

---

This invention relates to carbon black production.

In one of its more specific aspects, this invention relates to carbon black product control during the pelleting operation.

It is conventional to market carbon black in the form of pellets produced after the formation of the black. Most pelleting procedures include the introduction into the pelleter of the particulate black to which is added a pelleting agent which facilitates the pelleting. Such pelleting agents frequently consist of an aqueous solution of materials such as molasses, the water being removed from the pellets during a subsequent drying step.

It has been found that the pelleting operation frequently alters the structure of the black as indicated by its dibutylphthalate value. In fact, from the time the black leaves the furnace until it has been pelleted, there is a tendency for the black to decrease in structure as the result of its processing. To some degree, the extent to which the black decreases in structure depends upon the speed of rotation of the pelleter employed in the pelleting operation. Accordingly, it frequently happens that a carbon black, when collected from the smoke from the furnace is within certain structure specifications, but after the pelleting and drying operations, the structure of the black has fallen outside of the permissible specification ranges.

The method of this invention is directed towards alleviating this difficulty and towards providing a method for producing a plurality of product blacks of different structure properties from the same furnace product black. The method of this invention is related to the fact that changes in structure of the black from the time it leaves the furnace until it has been pelleted can be controlled by maintaining the speed of the pelleter constant and adjusting the quantity of hydrocarbon added to the black to facilitate its pelleting, or by maintaining the quantity of hydrocarbon addition constant and altering the pelleter speed, or altering both the rate of hydrocarbon addition and the pelleter speed. Accordingly, this invention is a method of controlling the structure change occurring in a carbon black during processing subsequent to its production which comprises pelleting the carbon black in the presence or absence of an aqueous solution and in the presence of a liquid hydrocarbon at a constant energy level input as indicated by the speed of rotation, determining the structure of the carbon black, comparing the determined structure value with the desired structure value and adjusting the quantity of oil introduced into the pelleter in response to the comparison to produce a carbon black pellet having the desired structure value.

The method of this invention is applicable to all classes of carbon black produced by any of the furnace processes. It is further applicable to any method of pelleting carbon black.

The hydrocarbon, the use of which is contemplated for pelleting by this invention, can be any hydrocarbon which will be substantially retained in the carbon black during pelleting. Generally a hydrocarbon comparable to a kerosene or middle distillate is preferred.

The hydrocarbon can be added to the black either before or after the addition of the aqueous pelleting solution. Preferably, the hydrocarbon will be added to the black prior to the addition of the aqueous solution. In general, the amount of the hydrocarbon employed will not affect the amount of the aqueous pelleting solution employed.

The hydrocarbon is employed in quantities ranging from about 0.006 gallon per thousand pounds of black to about 0.05 gallon per thousand pounds of black, preferably from about 0.006 to about 0.025 gallon per thousand pounds of black. Relatedly, the pelleter speed is varied from about 225 to about 500 r.p.m.

The hydrocarbon can be introduced into the carbon black by any method but is preferably introduced into the black as a mist in a gaseous fluid, such as air or nitrogen. When the hydrocarbon is introduced into the black in its vaporous state, since the black can contain air, there is a tendency for the black to oxidize in the presence of the mixture of vaporous hydrocarbon and air which is formed. Also, when the hydrocarbon is introduced into the black as a vapor, the hydrocarbon tends to rapidly condense on the black or on the equipment. Hence, the hydrocarbon is less thoroughly dispersed through the black in comparison with that dispersal attained where the atomized hydrocarbon is carried with the gaseous fluid throughout the black. The effect of the hydrocarbon addition is related to the speed of the pelleter inasmuch as the effect of the hydrocarbon varies with the speed of the pelleter, being greater at the higher pelleter speeds.

The following series of runs indicates the method of this invention.

A carbon black produced by the furnace process had a dibutylphthalate structure of 150 when recovered from the smoke after quenching. This black showed the usual tendency of blacks to decrease in structure with subsequent processing, and had a structure of 140 when introduced into the pelleter.

The black was divided into five quantities. Each was separately pelleted in the same pelleter under the same conditions, using about 3500 pounds of water per 3500 pounds of flocculent black, except that to four of the quantities, about 0.01 to 0.04 gallon of kerosene was added per thousand pounds of black. Various pelleter speeds were used. Dibutylphthalate results on the five quantities were as follows:

| Pelleter speed, r.p.m. | DBP value pelleted carbon black, cc./100 gms. black amount hydrocarbon added, gals./1,000# black | | | | |
|---|---|---|---|---|---|
| | 0 | 0.01 | 0.02 | 0.03 | 0.04 |
| Inlet (0) | *140 | | | | |
| 200 | 133 | 133 | 133 | 133 | 133 |
| 250 | 131 | 131 | 131 | 131 | 131 |
| 275 | 129 | 129.5 | 130 | 130.5 | 130.5 |
| 300 | 127 | 128 | 129 | 130 | 130 |
| 325 | 124 | 126.5 | 127 | 128 | 128 |
| 450 | 120 | 122.5 | 125 | 126 | 126 |

*Unpelleted.

These data are presented in the attached figure in which the structure of carbon black is related to the pelleter speed for various rates of hydrocarbon addition during the pelleting operation. It will be noted from this figure that as the amount of hydrocarbon added is increased, the reduction in structure of the black decreases.

The method of this invention was employed in an instance in which a series of blacks, identical except for structure values, were desired. The desired blacks were to have pelleted structure values of 120, 123, 126 and 130.

Accordingly, a single furnace carbon black run was made to produce a carbon black having an unpelleted structure of 140. In all pelleting operations equal weights of black and water were used. In run A, 0.01 gallon of kerosene per 1000 pounds of black was used, the kerosene being added to the black upstream of the pelleter, the pelleter speed being 425 r.p.m. This produced a pelleted black having a structure of 123.

In run B, the amount of oil used was 0.03 gallon per 1000 pounds of black, and the pelleter speed was 300 r.p.m. This produced a pelleted black having a structure of 130.

In run C, no oil was used and the pelleter speed was 425 r.p.m. This produced a pelleted black having a structure of 120.

For run D, the amount of oil used was 0.03 gallon per 1000 pounds of black and the pelleter speed was 425 r.p.m. This produced a pelleted black having a structure of 126.

Hence it is seen that from a single furnace product, pelleted blacks varying appreciably in structure were produced.

When changing from run A to B, both oil addition and pelleter speed were changed to increase the black pellet structure from 123 to 130. In changing from run A to D, the amount of oil was changed at the same pelleter speed to increase the structure of the pellets from 123 to 126. In changing from run A to C, only oil was changed to decrease the structure from 123 to 120. In changing from run B to D, only the pelleter speed was changed to decrease the structure of the pelleted black from 130 to 126.

It will be evident that in light of the foregoing disclosure various modifications can be made to the method of this invention. Such are, however, considered as being within the scope of the invention.

What is claimed is:

1. A method of producing carbon black pellets of a specified structure property value in the presence of an aqueous solution of a pelleting agent by pelleting in a rotating pelleter which comprises pelleting carbon black with a liquid hydrocarbon introduced into contact with said black, determining the structure of the pelleted black, and regulating at least one of the speed of rotation of said pelleter and the rate of introduction of said liquid hydrocarbon to produce carbon black pellets having said specified structure property value.

2. The method of claim 1 in which the speed of rotation of said pelleter is regulated.

3. The method of claim 1 in which the rate of introduction of said liquid hydrocarbon is regulated.

4. The method of claim 2 in which said speed of rotation is regulated within a range of from about 225 to about 500 r.p.m.

5. The method of claim 3 in which said rate of introduction is regulated within a range of from about 0.006 gallon per 1000 pounds of black to about 0.05 gallon per 1000 pounds of black.

6. The method of claim 1 in which the speed of rotation of said pelleter and the rate of introduction of said liquid hydrocarbon are regulated.

7. The method of claim 6 in which said speed of rotation is regulated within a range of from about 225 to about 500 r.p.m. and said rate of introduction of said liquid hydrocarbon is regulated within a range of from about 0.006 gallon per 1000 pounds of black to about 0.05 gallon pr 1000 pounds of black.

8. The method of claim 1 in which said liquid hydrocarbon is introduced into contact with said carbon black in a gaseous fluid.

9. The method of claim 1 in which the speed of rotation of said pelleter is maintained substantially constant and the rate of introduction of said liquid hydrocarbon is regulated upward to increase the structure of the pelleted black.

10. The method of claim 1 in which the rate of introduction of said liquid hydrocarbon is maintained substantially constant and the speed of rotation of said pelleter is regulated upward to decrease the structure of the pelleted black.

References Cited
UNITED STATES PATENTS

| | | | |
|---|---|---|---|
| 3,277,218 | 10/1966 | Dollinger | 264—117 |
| 3,459,844 | 8/1969 | Cole | 264—117 |

ROBERT F. WHITE, Primary Examiner

J. R. HALL, Assistant Examiner

U.S. Cl. X.R.

23—314; 264—117